June 12, 1923.  1,458,307
L. LEVAILLANT
DRY ELECTRIC BATTERY
Filed Jan. 12, 1923
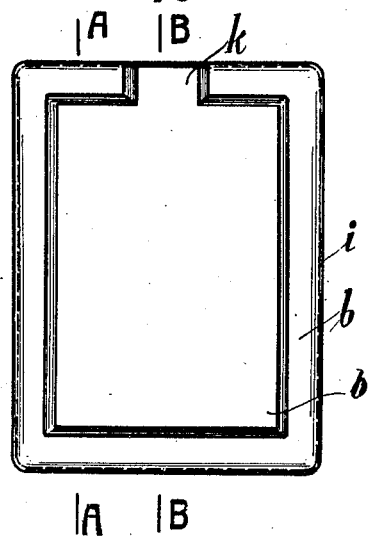
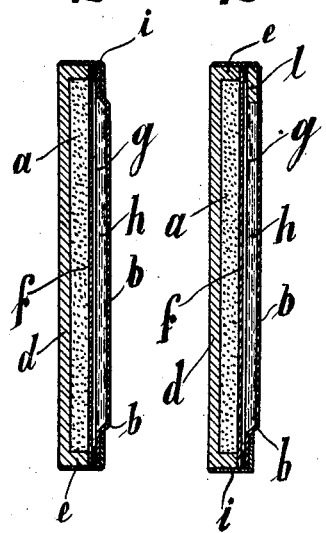
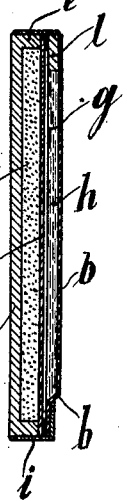
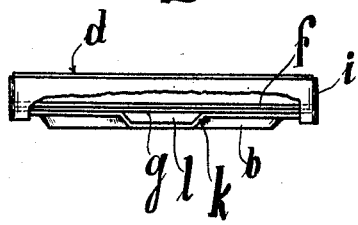
Inventor:
Louis Levaillant Patented June 12, 1923.

1,458,307

UNITED STATES PATENT OFFICE.

LOUIS LEVAILLANT, OF ZURICH, SWITZERLAND, ASSIGNOR TO HEINRICH GATTIKER-TANNER, OF ST. GALLEN, SWITZERLAND.

DRY ELECTRIC BATTERY.

Application filed January 12, 1923. Serial No. 612,240.

*To all whom it may concern:*

Be it known that I, LOUIS LEVAILLANT, a citizen of the Swiss Republic, residing at Zurich, Switzerland, have invented certain new and useful Improvements in Dry Electric Batteries, of which the following is a specification.

This invention relates to a dry electric battery of the kind built up of flat cells the electrodes of which consist of two superposed plates, one being made of zinc and the other of a mixture of carbon with manganese dioxide. As the battery is built up by simply placing the zinc plate of one cell against the carbon plate of the other cell, and since the electrolyte is enclosed between the plates of each cell, it is necessary for the plates to be impervious to moisture, and the carbon-manganese mixture is for this purpose usually compressed and impregnated with some waterproof substance. This process, however, has the disadvantage of impeding the reaction between the electrolyte and the carbon and thus lessening the activity of the cell.

This disadvantage is obviated by the present invention which consists in forming the carbon electrode out of a hard and impervious shell in the hollow of which a soft, active carbon-manganese mixture is accommodated, the zinc plate being applied to the rim of the carbon shell.

Fig. 1 of the accompanying drawings represents a front view of the improved cell, Fig. 2, a longitudinal section on the line A—A, and Fig. 3, a section on the line B—B, of Fig. 1.

Fig. 4 is an end view of the cell with partly removed covering.

The carbon electrode of each cell is composed of a shell $d$, $e$ which is made out of graphite or coke or a mixture of both and pressed hard and heated in the absence of air so as to be capable of retaining the electrolyte within the cell and of lending to the latter the necessary rigidity. In the hollow of this cell, a soft, active mixture $a$ of graphite and manganese dioxide is accommodated. This mixture may be applied in the form of a paste, or it may be pressed into a plate which is fitted into and cemented to the shell $d$ so as to be in conducting contact therewith. The electrode thus formed is covered by a porous diaphragm $f$, and to the margins of this diaphragm a narrow insulating strip is applied as a support for the zinc electrode $b$. The latter consists of a dished plate in the hollow of which, between the plate and the diaphragm $f$, the pasty electrolyte $h$ is accommodated. The plate $b$ is preferably formed with a neck $k$ through which the electrolyte can be admitted after the electrodes have been assembled and connected, an arrangement which allows the actual completion of the cells to be delayed until they are required for use. After the introduction of the electrolyte, the neck is closed by a seal $l$ of wax or the like. A wax covering $i$ is also applied to the edges of the cell.

In building up the battery, the cells are placed side by side in the usual manner, the zinc plate $b$ of one cell being placed against the carbon shell $d$ of the next. To reduce the resistance, a copper layer may be applied, preferably by electro-plating, to the outside of the shell $d$.

It is possible to form the carbon electrode $d$, $e$ out of a single flat plate composed of a mixture of graphite and manganese dioxide, this plate being subsequently impregnated at one side and at the edges to produce the dished, impervious shell $d$, $e$.

I claim:—

1. An electric battery cell of the character described, comprising a carbon electrode composed of a hard impervious shell and of a soft active carbon-manganese mixture accommodated in the hollow of said shell, a zinc electrode composed of a dished plate applied to the rim of said shell so as to cover the active mixture, a porous diaphragm interposed between the electrodes, and an electrolyte arranged between the diaphragm and the zinc plate.

2. An electric battery cell of the character described, comprising a carbon electrode composed of a hard impervious shell and of a soft active plate formed of a carbon-manganese mixture and fitted in the hollow of said shell, a zinc electrode composed of a dished plate applied to the rim of said shell so as to cover the active mixture, a porous diaphragm interposed between the electrodes, and an electrolyte arranged between the diaphragm and the zinc plate.

3. An electric battery cell of the character described, comprising a carbon electrode composed of a hard impervious shell and of a soft active carbon-manganese mixture accommodated in the hollow of said shell, a zinc electrode composed of a dished plate applied to the rim of said shell so as to cover the active mixture, a porous diaphragm interposed between the electrodes, and an electrolyte arranged between the diaphragm and the zinc plate, the zinc plate being formed with a neck through which the electrolyte can be introduced after the electrodes have been assembled and connected.

LOUIS LEVAILLANT.